(12) United States Patent
Bernig et al.

(10) Patent No.: US 7,722,936 B2  
(45) Date of Patent: May 25, 2010

(54) HEAT-SHRINKABLE MULTILAYER FILMS

(75) Inventors: Walter Bernig, Rettenberg (DE); Christoph Schweitzer, Obergunzburg (DE)

(73) Assignee: CFS Kempten GmbH, Kempten (DE)

( * ) Notice: Subject to any disclaimer, the term of this patent is extended or adjusted under 35 U.S.C. 154(b) by 660 days.

(21) Appl. No.: 11/568,019

(22) PCT Filed: Apr. 19, 2005

(86) PCT No.: PCT/EP2005/004174  
§ 371 (c)(1), (2), (4) Date: May 3, 2007

(87) PCT Pub. No.: WO2005/108068  
PCT Pub. Date: Nov. 17, 2005

(65) Prior Publication Data  
US 2007/0298198 A1 Dec. 27, 2007

(30) Foreign Application Priority Data  
May 6, 2004 (DE) ........................ 10 2004 023 023

(51) Int. Cl.  
*B65B 53/00* (2006.01)  
*F16B 4/00* (2006.01)

(52) U.S. Cl. .................. 428/34.9; 428/35.7; 428/35.9; 428/36.6; 428/36.7; 428/212; 428/500; 428/215; 428/216; 428/36.91; 428/35.2; 156/60

(58) Field of Classification Search ................ 428/35.7, 428/35.9, 36.6, 36.7, 34.9, 212, 500, 215, 428/216, 36.91, 35.2; 156/60  
See application file for complete search history.

(56) References Cited

U.S. PATENT DOCUMENTS

| | | | |
|---|---|---|---|
| 3,456,044 A | 7/1969 | Pahlke | |
| 4,161,562 A | 7/1979 | Yoshikawa et al. | |

FOREIGN PATENT DOCUMENTS

| | | |
|---|---|---|
| DE | 2758320 | 7/1978 |
| DE | 3626809 | 12/1987 |
| EP | 1052090 | 11/2000 |
| JP | 03024954 | 2/1991 |
| JP | 06000921 | 1/1994 |
| WO | WO 98/36903 | 8/1998 |

*Primary Examiner*—Michael C Miggins  
(74) *Attorney, Agent, or Firm*—Norris McLaughlin & Marcus PA

(57) ABSTRACT

Heat-shrinkable multilayer films having a surface layer based on at least one olefinic polymer and/or copolymer, a layer based on a mixture of an ionomer having a maximum MFI of 4 dg/min and an ionomer having an MFI>4 dg/min, a barrier layer based on polyvinylidene chloride or a vinylidene chloride polymer, a layer based on the ionomer mixture or an olefinic copolymer, and a sealing layer of at least one polyolefin or olefinic copolymer.

25 Claims, No Drawings

HEAT-SHRINKABLE MULTILAYER FILMS

This is a 371 of PCT/EP2005/004174 filed 19 Apr. 2005 (international filing date).

The present invention relates to heat-shrinkable multilayer foils encompassing a surface layer based on at least one olefinic polymer and/or copolymer, a layer based on a mixture composed of an ionomer whose MFI is up to at most 4 dg/min and of an ionomer whose MFI is >4 dg/min, a barrier layer based on polyvinylidene chloride or on a vinylidene chloride copolymer, a layer based on the ionomer mixture mentioned or on an olefinic copolymer, and a sealable layer composed of at least one polyolefin or olefinic copolymer, preferably in the form of a tubular bag, and to its use as packaging, and to the corresponding tubular-bag packaging.

BACKGROUND OF THE INVENTION

Biaxially oriented, heat-shrinkable multilayer foils are used in the packaging of food and drink, in particular of perishable foods, such as poultry or fresh meat, and these multilayer foils preferably have an oxygen-barrier layer. Heat-shrinkable multilayer foils have the property of reverting via shrinkage to their initial unoriented dimensions when they are heated as far as their softening point. Biaxially oriented multilayer foils have been stretched not only longitudinally but also transversely in their production process and their shrinkage is preferably at least 35% both longitudinally or in machine direction and transversely, i.e. in non-machine direction.

Biaxially oriented, heat-shrinkable multilayer foils currently used commercially preferably have an external layer composed of an ethylene-vinyl acetate copolymer, if appropriate mixed with a polyethylene, preferably with an LLDPE, and, as oxygen-barrier layer, a layer based on polyvinylidene chloride, since these thermoplastic materials have excellent shrinkage behavior.

A disadvantage with multilayer foils of this type is that their strength is sometimes inadequate, i.e. their puncture resistance is inadequate when the shrink foil is subject to mechanical stress, e.g. during the packaging of foods with protruding bones. In order, therefore, to improve puncture resistance, heat-shrinkable multilayer foils have previously been equipped with an ionomer layer based on an ethylene-acrylic acid copolymer to some extent in the form of sodium salt. However, in order to achieve adequate adhesion between this type of ionomer layer and a barrier layer based on polyvinylidene chloride, it was necessary to introduce a conventional adhesion-promoter layer. However, this measure implies not only higher materials costs and higher production costs for these shrinkable multilayer foils but also implies relatively high thicknesses, and this is rather undesirable for heat-shrinkable multilayer foils. Furthermore, relatively complicated extrusion equipment is needed.

It was therefore an object of the present invention to provide a heat-shrinkable multilayer foil which has improved mechanical strength, in particular has relatively high puncture resistance together with adequate adhesion without use of an adhesion-promoter layer between the ionomer layer which improves strength and the barrier layer, therefore being thinner than a corresponding multilayer foil used commercially.

SUMMARY OF THE INVENTION

The object is achieved via the provision of the inventive, heat-shrinkable, biaxially oriented multilayer foil, which encompasses the following layer structure:
a) a surface layer based on at least one olefinic polymer and/or copolymer,
b) a layer based on a mixture composed of an ionomer whose MFI is up to at most 4 dg/min and of an ionomer whose MFI is >4 dg/min,
c) a barrier layer based on polyvinylidene chloride or on a vinylidene chloride copolymer,
d) a layer based on an ionomer mixture according to layer b) or on a conventional adhesion promoter based on an olefinic copolymer,
e) a sealable layer based on at least one polyolefin and/or olefinic copolymer.

DETAILED DESCRIPTION

The layer a), which in the inventive multilayer foil is usually used as external layer of packaging, e.g. of a shrink bag, is preferably based on a polyethylene (PE), particularly preferably on a PE whose density is <0.92 g/cm³, or m-PE (metallocene polyethylene) and/or on an ethylene copolymer, particularly preferably on an ethylene-vinyl acetate copolymer. The layer a) is very particularly preferably based on a mixture composed of an LLDPE (linear low-density polyethylene) or m-PE and of an ethylene-vinyl acetate copolymer, this mixture preferably being composed of from 70 to 90% by weight of LLDPE and/or m-PE, from 10 to 30% by weight of ethylene-vinyl acetate copolymer and, if appropriate, up to 5% by weight of conventional additives, based in each case on the total weight of the layer a) with 100% by weight.

Conventional additives mean antiblocking agents, antistatic agents, and/or lubricants.

The thickness of the layer a) is preferably less than 20% of the total thickness of the inventive, heat-shrinkable multilayer foil. The thickness of this layer is particularly preferably in the range from 5 to 10 μm.

The layer b), which is adjacent to the external layer a) and has been bonded to the barrier layer c) is based on a mixture of ionomers, i.e. on a mixture composed of ethylene-acrylic acid copolymers or ethylene-methacrylic acid copolymers, each of which is present at least to some extent, preferably up to 35%, in the form of a salt, preferably in the form of Na salt or of Zn salt, the MFI of one component of the mixture here preferably being from 1.5 to 4 dg/min, particularly preferably up to at most 2 dg/min, the MFI of the second component of the mixture being up to at most 5 dg/min. In the mixture, the amount of the two components of the mixture is from 35 to 65% by weight and from 65 to 35% by weight, in each case based on the total weight of the layer b) with 100% by weight.

The MFI of the mixture is very particularly intended to be in the range from 1.5 to 4 dg/min.

The melt index (MFI) is always determined to ASTM 1238 (at 190° C., 2.16 kg/10 min).

The thickness of the layer b) is preferably in the range from 5 to 10 μm, very particularly preferably in the range from 6 to 8 μm.

The barrier layer c) is based on a polyvinylidene chloride or on a vinylidene chloride-methacrylic acid copolymer having up to 10% by weight of methacrylic acid units.

The thickness of the layer c) is preferably from 3 to 8 µm, very particularly from 4 to 6 µm.

It gives the inventive heat-shrinkable multilayer foil an oxygen transmission of at most 20 cc/m$^2$.d.bar, preferably in the range from 7 to 15 cc/m$^2$.d.bar.

The layer d) is preferably based on an olefinic copolymer, particularly preferably on an ethylene copolymer, very particularly preferably on an ethylene-vinyl acetate copolymer, thus again permitting an increase in the strength of the inventive foil.

However, for reasons of production technology, it is also possible for the layer d) to be manufactured from an ionomer mixture identical with that of the layer b).

The thickness of the layer d) is preferably from 5 to 10 µm, particularly preferably from 6 to 9 µm.

If an ethylene-vinyl acetate copolymer is present in the external layer a) or in the layer d), this copolymer is preferably composed of from 10 to 30 mol % of vinyl acetate units, particularly preferably of from 12 to 20 mol % of vinyl acetate units.

The layer e), which is used as sealable layer and, in a packaging composed of the inventive multilayer foil, represents the layer facing toward the contents, is based on at least one polyolefin or olefinic copolymer, preferably on at least one polyethylene, particularly preferably on a mixture of m-PE (metallocene polyethylene), whose density is particularly preferably greater than or equal to 0.9 g/cm$^3$, and of an LLDPE whose density is greater than or equal to 0.9 g/cm$^3$. The mixture is preferably composed of from 70 to 85% by weight of m-PE, from 30 to 15% by weight of LLDPE and, if appropriate, up to 5% by weight of conventional additives, based in each case on the total weight of the layer e) with 100% by weight. The layer e) can also be based on at least one polypropylene and/or propylene copolymer, preferably on a propylene-ethylene copolymer.

Additives preferably used comprise antiblocking agents, antistatic agents, and/or lubricants.

The thickness of the sealable layer is at least 25%, preferably up to 35%, of the total thickness of the inventive multilayer foil. The thickness is particularly preferably at least 10 µm, very particularly preferably in the range from 10 to 20 µm.

The thickness data are the thickness of the respective layer of the inventive multilayer foil after longitudinal and transverse orientation.

The inventive multilayer foil is preferably produced by the blown-film process via coextrusion, e.g. as described in U.S. Pat. No. 3,456,044. However, it is also possible here to begin by extruding only the layer a) in the form of a tube and to apply the layers subsequent thereto via a coextrusion process, or to begin by extruding any desired sublayer combination in the form of tubular foil and then immediately to bond this to the remaining layers via extrusion.

Another possibility consists in producing the inventive multilayer foil by the chill-roll process with longitudinal and transverse orientation.

During production, the foil is preferably oriented in machine direction, i.e. longitudinally, with a ratio of from 1:3 to 1:5, particularly preferably from 1:3.5 to 1:4.5, and oriented transversely to the machine direction with a ratio of from 1:3 to 1:5, particularly preferably from 1:3.5 to 1:4.5.

In the inventive multilayer foil, one or all of the layers of the inventive multilayer foil can be crosslinked in order to improve its usage properties—and/or puncture resistance.

This crosslinking can be achieved with use of β-radiation (high-energy electrons) and the like. The radiation source can be any desired electron-beam generator operating in the range from about 150 kV to about 300 kV. The irradiation is usually undertaken with a dose of up to 60 kGy, a preferred dose being in the range from 30 kGy to 50 kGy. As previously mentioned, this type of irradiation can be applied to the entire foil or restricted to individual layers, e.g. the external layer.

The polymers used in the layer structure are commercially available products and are widely described in the prior art. For production of the inventive multilayer foils, they are usually mixed in the form of pellets or granules if necessary in conventional mixing apparatuses, and via melting, preferably with the aid of extruders, converted into the desired final form. As mentioned above, preference is given to production by the blown-film process, the extruders used comprising extruders with coextruder dies, which ensure that a bubble is formed. The processing temperatures, in particular for extrusion, are known to the person skilled in the art and are generally stated when the plastics are supplied.

The inventive multilayer foils have excellent suitability as packaging material, in particular as shrinkable shrink bags with excellent optical and mechanical properties. The invention also provides the use of the inventive multilayer foils for the packaging of goods a very wide variety of types, preferably of food or drink, and provides packages produced therefrom; preference being given to tubular-bag packages.

Method for Testing of Adhesion after Shrinkage of the Foil

Equipment Needed
    Material to be tested: inventive (multilayer foil)
    Block (size W×H×T=150 mm×120 mm×30 mm)
    Foil knife
    Razor blade
    Immersion bath whose water temperature is 93° C.
    Ethanol
    IR spectrometer Experimental Method
    A piece of length about 130 mm is cut off the inventive multilayer foil tube to be tested and the tube is slit open at a folding seam. The block is placed with its longer narrow side on the remaining folding seam of the tube in such a way that the two sides of the foil externally enclose the block and the ends of the foil are held over the block. The foil is not permitted to extend beyond the corners of the block.

The shrinkage of the foil is measured via immersion of the block with foil for 6 sec in water heated to 93° C. (±1° C.). Six samples of the multilayer foil are shrunk. In each case, 15 mm test strips of foil (perpendicular to the direction of running of the machine) are cut out within the shrunk region at sites with maximum freedom from folding. Six test strips are needed. At the test site, a razor blade is used to make incipient slits in the foil and ethanol is used to solvate the composite, and six test strips with separation between layer b) and layer c) are thus prepared. An IR spectrometer is used to test separation. Bond strength (adhesion) is then tested with the aid of a UTS 2 tensile testing machine (adhesion software program to DIN 53357) at the site of separation on each of the six test strips. The angle of peel is in each case 90°. The result is recorded electronically. The value measured for adhesion is stated in N/15 mm.

Method for Testing Shrinkability

To measure shrinkability of an inventive foil, a foil marker is used to draw a 10×10 cm crosswire pattern on the foil sample to be tested, one line being drawn in machine direction (md), i.e. extrusion direction, and the second line of the crosswire pattern being drawn perpendicularly to machine direction (cma). The temperature of the water bath into which the foil sample is immersed for 6 sec is 93° C.

After 6 sec, the sample is removed and the shortening of the crosswire pattern is measured and then stated in % for the respective direction.

EXAMPLES

Inventive Example 1

An inventive multilayer foil with the following layer structure:
a) a surface layer composed of 81% by weight of LLDPE whose density is 0.911 g/cm$^3$, 15% by weight of an ethylene-vinyl acetate copolymer having 28 mol % of vinyl acetate, and 4% by weight of an antiblocking agent, the thickness of this layer being 8 μm
b) a layer composed of a mixture composed of 50% by weight of an ionomer (Surlyn® from DuPont) whose MFI is 1.3 dg/min and of 50% by weight of an ionomer (Surlyn® from DuPont) whose MFI is 4.3 dg/min, in each case 35% thereof being present in the form of Na salt, the thickness of this layer being 7 μm
c) a barrier layer based on polyvinylidene chloride (Ixan PVS from Solvin GmbH & Co. KG), the thickness of this layer being 5 μm
d) a layer composed of an ethylene-vinyl acetate copolymer identical with the copolymer in layer a), the thickness of this layer being 8 μm, and
e) a sealable layer composed of a mixture composed of 73% by weight of polyethylene whose density is 0.895 g/cm$^3$, 24% by weight of an LLDPE whose density is 0.911 g/cm$^3$, and 3% by weight of an antiblocking agent, the thickness of this layer being 15 μm;

was produced with the aid of a blown-film-coextrusion process with orientation of 1:4 both in machine direction and also perpendicularly thereto. The multilayer foil was crosslinked with the aid of an electron beam at 190 kV using a dose of 50 kGy.

Shrinkability was measured by the method stated above and was about 40%.

Adhesion, measured by the method stated above, was 2.0 N/15 mm.

Comparative Example 1

A multilayer foil was produced as stated in inventive example 1 with identical structure with the exception of the layer b). The layer b) was produced from an ionomer (Surlyn®) whose MFI is 1.0 dg/min. The respective layer thicknesses, and the orientation and crosslinking were the same as those of the multilayer foil of inventive example 1.

Shrinkability was determined by the method stated above and was about 40%.

Adhesion, measured by the method stated above, was only 0.121 N/15 mm.

The invention claimed is:
1. A biaxially oriented, heat-shrinkable multilayer film having the following layer structure:
   a) a surface layer based on at least one olefinic polymer, on at least one olefinic copolymer or based on a combination of at least one olefinic polymer and at least one olefinic copolymer,
   b) a layer based on a mixture composed of an ionomer whose MFI is up to at most 4 dg/min and of an ionomer whose MFI is >4 dg/min,
   c) a barrier layer based on polyvinylidene chloride or on a vinylidene chloride copolymer,
   d) a layer based on an ionomer mixture according to layer b) or on an olefinic copolymer,
   e) a sealable layer based on at least one polyolefin and/or olefinic copolymer.

2. The multilayer film as claimed in claim 1, wherein the layer a) comprises a polyethylene or m-PE as olefinic polymer, an ethylene copolymer as olefinic copolymer, or both such olefinic polymer and olefinic copolymer.

3. The multilayer film as claimed in claim 1, wherein the thickness of the layer a) is less than 20% of the total thickness of the multilayer foil.

4. The multilayer film as claimed in claim 1, wherein the layer b) comprises, as ionomers, ethylene-acrylic acid copolymers or ethylene-methacrylic acid copolymers, each of which is present at least to some extent in the form of sodium or Zn salt.

5. The multilayer film as claimed in claim 1, wherein the MFI of one ionomer is up to at most 2 dg/min and the MFI of the second ionomer is up to at most 5 dg/min.

6. The multilayer film as claimed in claim 1, wherein the mixture of the layer b) is composed of from 35 to 65% by weight of one of the ionomers and from 65 to 35% by weight of the second ionomer.

7. The multilayer film as claimed in claim 1, wherein the thickness of the layer b) is from 5 to 10 μm.

8. The multilayer film as claimed in claim 1, wherein the layer c) is based on a polyvinylidene chloride or on a vinylidene chloride-methacrylic acid copolymer.

9. The multilayer film as claimed in claim 1, wherein the thickness of the layer c) is from 3 to 8 μm.

10. The multilayer film as claimed in claim 1, wherein the layer d) is based on an ionomer mixture corresponding to the ionomer mixture of the layer b) or on an ethylene copolymer.

11. The multilayer film as claimed in claim 1, wherein the thickness of the layer d) is from 5 to 10 μm.

12. The multilayer film as claimed in claim 1, wherein the polyethylene mixture of the layer e) is composed of from 70 to 85% by weight of m-PE and from 30 to 15% by weight of LLDPE and, optionally, up to 5% by weight of conventional additives, based in each case on the total weight of the layer e) with 100% by weight.

13. The multilayer film as claimed in claim 1, wherein the thickness of the layer e) makes up at least 25% of the total thickness of the multilayer foil.

14. The multilayer film as claimed in claim 1, wherein the thickness of the layer e) is at least 10 μm.

15. The multilayer film as claimed in claim 1, wherein the longitudinal stretching ratio of the multilayer foil is from 1:5 to 1:3 and its transverse stretching ratio is from 1:5 to 1:3.

16. The multilayer film as claimed in claim 1, wherein the multilayer foil is a tubular foil.

17. The multilayer film as claimed in claim 1 wherein the layer a) is based on a mixture composed of LLDPE and ethylene-vinyl acetate copolymer, a mixture composed of m-PE and ethylene-vinyl acetate copolymer, or a mixture composed of LLDPE, m-PE and ethylene-vinyl acetate copolymer.

18. The multilayer film as claimed in claim 17, wherein the mixture is composed of from 70 to 90% by weight of LLDPE and from 10 to 30% by weight of ethylene-vinyl acetate copolymer, of from 70 to 90% by weight of m-PE and from 10-30% by weight of ethylene-vinyl acetate or of from 70 to 90% by weight of a combination of LLDPE and m-PE and from 10-30% by weight of ethylene-vinyl acetate: in each case optionally also including up to 5% by weight of conventional additives, based in each case on the total weight of the layer a).

19. The multilayer film as claimed in claim 3 wherein the ethylene-vinyl acetate copolymer has up to at most 30 mol % of vinyl acetate units.

20. The multilayer film as claimed in claim 1, wherein the layer e) is based on at least one polyethylene, on at least one polypropylene, or on propylene copolymers.

21. The multilayer film as claimed in claim 20, wherein the layer e) is based on a mixture composed of m-PE and LLDPE.

22. A method of forming a tubular bag which comprises forming the tubular bag from a multilayer film of claim 1.

23. A tubular bag composed of a multilayer film of claim 1.

24. A method of packaging food or drink which comprises packaging said food or drink in a tubular bag of claim 23.

25. A packaging composed of a tubular bag as claimed in claim 23.

* * * * *